May 18, 1943. C. D. RYDER 2,319,479
SELF-LOCKING PLASTIC INJECTION MOLD
Filed Oct. 18, 1939 2 Sheets-Sheet 1
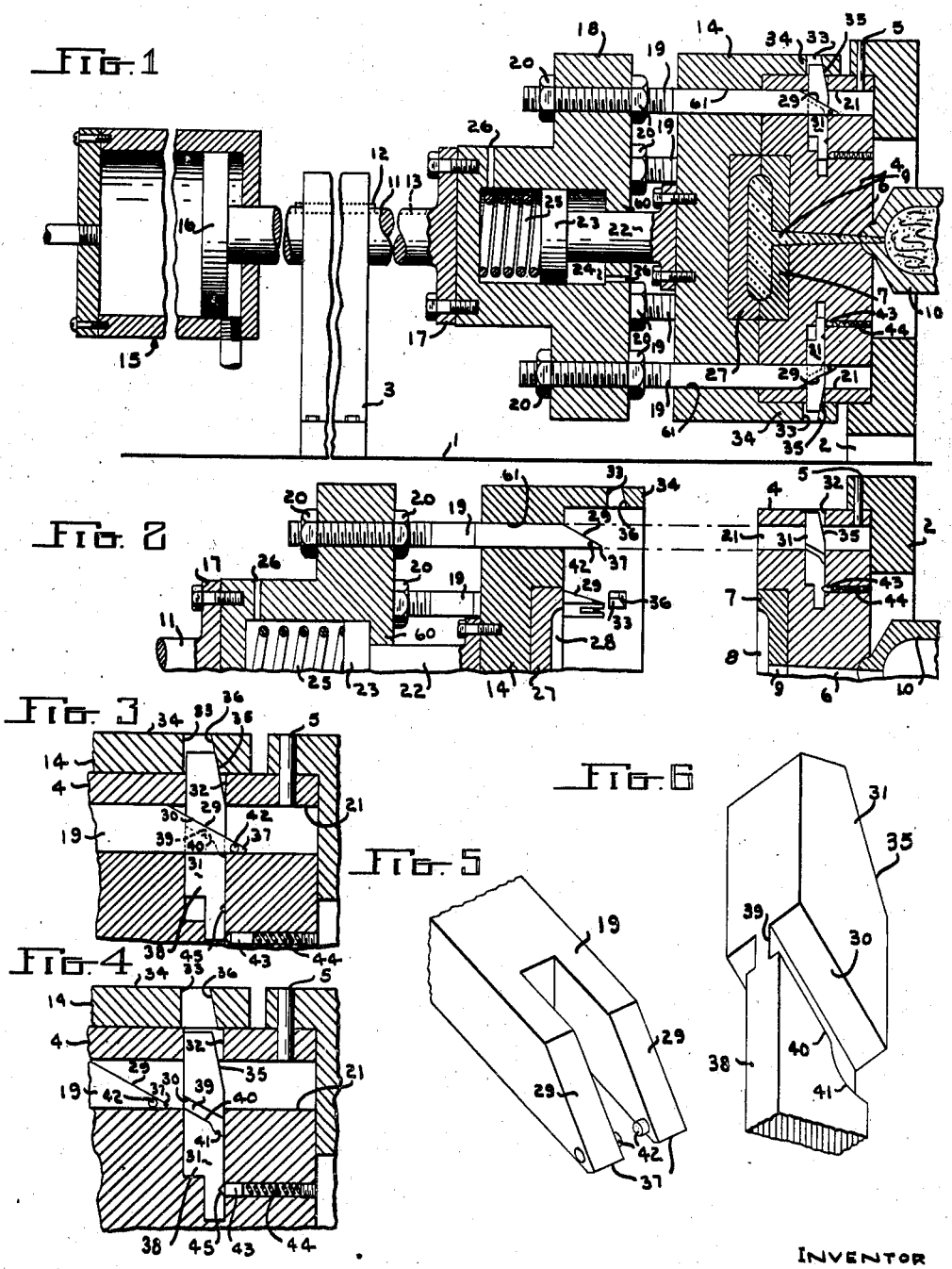
INVENTOR
CHARLES D. RYDER
BY
ATTORNEYS May 18, 1943. C. D. RYDER 2,319,479
SELF-LOCKING PLASTIC INJECTION MOLD
Filed Oct. 18, 1939 2 Sheets-Sheet 2
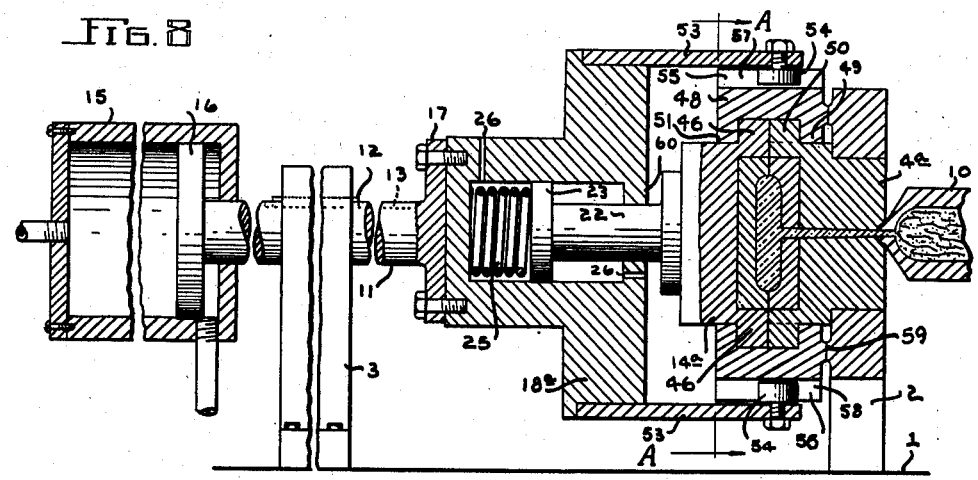
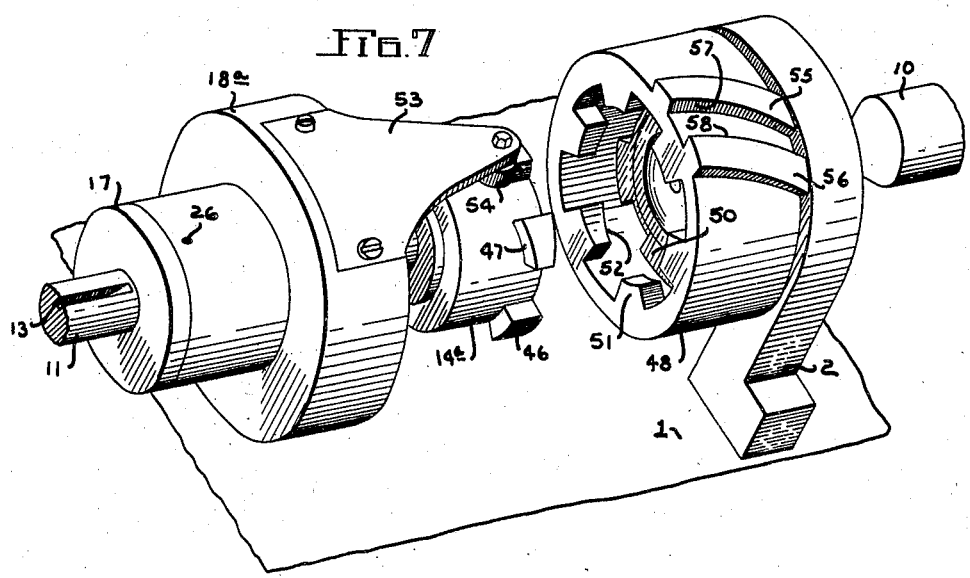
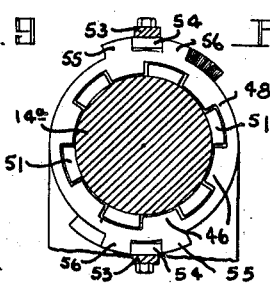
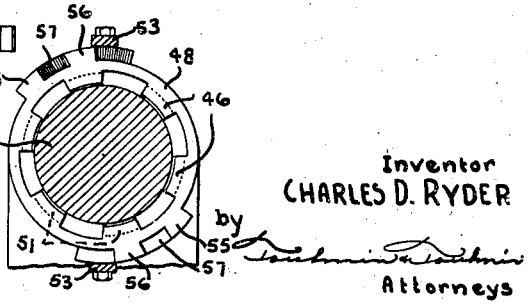
Inventor
CHARLES D. RYDER
by
Attorneys Patented May 18, 1943

2,319,479

UNITED STATES PATENT OFFICE 2,319,479

SELF-LOCKING PLASTIC INJECTION MOLD

Charles D. Ryder, Covington, Ky., assignor to The Grotelite Company, Bellevue, Ky., a corporation of Kentucky Application October 18, 1939, Serial No. 300,034

4 Claims. (Cl. 18—30)

This invention relates to a self-locking plastic injection mold, that is, a mold which is complete with its own locking mechanism, and which does not depend upon any locking feature of the injection molding machine to hold it closed, the mold being locked automatically by the act of moving the mold halves into engagement with one another.

Heretofore in the art, it has been customary to provide means for locking the mold halves together so that they will not separate during the injection step, said means comprising toggles, cams, wedges, or the like, actuated by mechanism outside of the mold halves themselves, it being usual to provide means for synchronizing the locking devices with respect to the other steps of the injection molding process. Such locking mechanism and synchronizing control means are expensive to manufacture and increase the complexity of the injection molding machine, thereby increasing the liability of the machine to get out of order and increasing the cost of maintenance of the machine. Where the control of the locking device is manual, the injection operation involves the necessity for the operator to manipulate the manual control at the proper time in each molding cycle. The present invention, by making the step of moving the mold halves together automatically lock them, eliminates these disadvantages and provides a new and more facile mode of operation.

The principal object of the present invention is, therefore, to devise a plastic injection mold which contains its own locking mechanism and which does not depend upon manipulation of any mechanism other than the mold closing mechanism for irreversibly locking the mold halves together; with the present invention, as the mold halves are brought together, this act of bringing them together actuates locking mechanism associated with them to lock them positively and irreversibly together.

Another object is to provide a device of the foregoing type wherein the provision of the self-locking means does not materially interfere with the accessibility to the mold cavities and does not add to the complexity of the molding machine, but, on the contrary, simplifies its construction.

Another object is to accomplish the foregoing objects by the provision of a longitudinally slidable mold carrying member upon which is yieldingly carried the movable mold half, the yielding mounting of the movable mold half serving to mold the movable mold half into lockable position against the stationary mold half, and the yielding mounting further allowing the longitudinally movable member to continue in its movement towards the stationary mold half and in this continuing movement to lock the mold halves together.

Another object is to accomplish the foregoing object by mechanism which embodies cammed push rods actuating locking bolts carried by one of the mold halves to project these locking bolts through adjacent portions of the mold halves and in a direction normal to the direction of movement of the movable mold half.

Another object is to accomplish the foregoing objects by mechanism which utilizes a rotatable locking sleeve carried on one of the mold halves, this locking sleeve being rotated to lock or unlock the mold halves by the further movement of the longitudinally movable member after the movable mold half has been brought into engagement with the stationary mold half; this form of the invention involves the application of the inventive thought of the present invention to the mold locking device of my co-pending application, Serial No. 299,661, filed October 16, 1939.

Another object is to accomplish the foregoing objects while providing mechanism wherein the mold halves are automatically unlocked by the retraction of the member which carries the movable mold half, so that with the present invention no outside mechanism is required for effecting either locking or unlocking other than that which would normally be used for the operation of moving the mold halves into and out of engagement with one another.

Another object is to accomplish the locking and unlocking by means such as a hydraulic motor of relatively limited power and force, the locking and unlocking in accordance with the present invention being very easily accomplished, and it being unnecessary to maintain high hydraulic pressure to hold the mold halves clamped during the injection process.

Still other objects and advantages of the present invention will be apparent to those skilled in the art as the following description of embodiments of the present invention proceeds.

In the accompanying drawings:

Figure 1 is a longitudinal vertical section through an injection molding machine representing one embodiment of the present invention. This figure shows the mold halves self locked together.

Figure 2 is a partial sectional view similar to

Figure 1 but showing the mold halves separated from one another either after or preparatory to locking them into the position of Figure 1.

Figure 3 is an enlarged sectional view showing the locking mechanism in the locked position of Figure 1.

Figure 4 is a similar view but showing the mold halves engaged with one another and about to be locked, or just after having been unlocked but prior to their separation.

Figure 5 is an enlarged perspective view of the locking portion of one of the cam push rods.

Figure 6 is an enlarged perspective view of a portion of one of the locking bolts.

Figures 7 to 10 portray a modification in which a rotatable locking sleeve is employed and in which;

Figure 7 is a perspective view;

Figure 8 is a longitudinal vertical section;

Figure 9 is a transverse vertical section on the line A—A of Figure 8 but showing the mold halves in engagement and before rotation of the locking sleeve;

Figure 10 is a transverse vertical section on the line A—A of Figure 8 showing the position of the parts after locking has been effected by rotation of the locking sleeve.

Referring to the drawings in detail and, first, to Figures 1 to 6, reference numeral 1 designates the base of an injection molding machine having an intermediate support 2 and a rear support 3. Fixedly mounted upon support 2, as by means of dowel pins 5, is a stationary mold half 4, which may be additionally secured against longitudinal and rotative movement as by being shrunk fit into the recess provided therefor in support 2, and if desired, by having a polygonal configuration to prevent rotation. Mold half 4 has the usual injection gate 6 and is recessed in its rear face to receive the insert 7 which is provided with the mold cavity 8 in communication with gate 6 by means of coaxial gate 9. Reciprocable into and out of engagement with mold half 4 is the usual injection cylinder 10 having the usual nozzle in axial alignment with gate 6 and adapted to supply fluent plastic material to fill the mold cavity at the appropriate point in the operation of the machine.

Rear support 3 carries a shaft 11 which is longitudinally slidably but nonrotatably mounted therein as by means of feather key 12 operating within lengthwise slot 13 in shaft 11. This shaft 11 carries the movable mold half 14 in a manner which will appear below. Shaft 11 is adapted to be reciprocated longitudinally at the desired time by means of mold closing and opening hydraulic motor 15 disposed at its rear end and having a piston 16 fixedly or integrally connected to shaft 13. Hydraulic motor 15 may be of very limited dimensions and power because it does not have to exert a force sufficient to hold the mold halves closed against the pressure of injection, but merely has to move the mold halves together and effect operation of the locking means carried thereby.

Forward end of shaft 11 is flanged outwardly as at 17, this flange 17 fixedly carrying a member 18 which serves to carry both the mold half and the mold locking cam push rods 19, which are disposed at spaced intervals adjacent the periphery of member 18. The cam rods 19 are longitudinally adjustably mounted on member 18 by means of adjusting nuts 20 which enable them to be individually adjusted longitudinally. Cam rods 19 are adapted to slidably extend through receiving bores 21 and 61 provided therefor in mold halves 4 and 14, respectively. The movable mold half 14 is fixedly mounted on a longitudinally slidable piston rod 22 having a piston 23 slidably operating within a cylindrical cavity 24 provided therefor in the body of the member 18. A yielding member such as compression spring 25 is disposed between piston 23 and the rear face of cavity 24 and is adapted to project the mold half 14 forwardly but to be compressed after the mold half 14 is in engagement with mold half 4, thus allowing the member 18 to continue its travel forwardly to effect the locking of the mold. Air vents 26 are suitably provided to allow free operation of piston 23. Member 18 is provided with a forward portion 60 for causing retraction of piston 23 and of mold half 14 when member 18 is retracted.

Mold half 14 is recessed to receive a mold insert 27 having a mold cavity 28 adapted to cooperate with mold cavity 8 to form the mold space. Instead of using changeable mold inserts 7 and 27, the mold cavities may be cut directly in the engaging faces of mold halves 4 and 14. The forward ends of cam rods 19 are beveled as at 29, this beveled portion 29 being adapted to cooperate with a correspondingly beveled portion 30 on the locking bolt 31 which is adapted to lock the mold. A locking bolt 31 is provided for each of the push rods 19 and these locking bolts 31 extend radially in mold member 4, being slidably mounted in radial bores 32 and being adapted to be projected outwardly by push rods 19 into a radial bore 33 in forwardly extending flange 34 of mold half 14. These locking bolts 31 have a cam or wedging surface 35 on their forward face, this inclined surface 35 being adapted to cooperate with a correspondingly inclined cam surface 36 on the forward face of bores 33. While the cam surfaces 29 and 30 may have a relatively high degree of inclination, the cam surfaces 35 and 36 which actually lock the mold halves together irreversibly, should be of such slight inclination that their wedging action is irreversible. This inclination will depend upon the co-efficient of friction for the materials employed and may readily be calculated so as to give the irreversible locking action desired.

From the foregoing, it will be seen that as member 18 is projected forwardly, the first step is the engagement of mold halves 4 and 14, whereupon mold half 14 stops in its forward motion, but member 18 continues forwardly, pushing rods 19 forwardly and causing locking bolts 31 to be slid radially outwardly into irreversible locking engagement within the bores 33 provided therefor in flange 34 which is integral with mold half 14.

In order to unlock the mold halves when member 18 is moved rearwardly, the following means is provided. The push rods 19 are bifurcated in two ears 37, between which there is adapted to be received a dovetail inward projection 38 of locking bolt 31. Locking bolts 31 are provided with a recess 39 adjacent inclined cam face 30 and the inclined edge 40 of this recess 39 is provided with a dished or cupped portion 41 extending to the forward edge of the dovetailed projection 38. Projecting from the inner faces of the ears 37 of push rods 19 and adjacent their extreme forward tip are a pair of fixed pins 42 and these pins 42 are adapted to push downwardly on inclined edge 40 as push rods 19 are retracted, thereby pulling the locking bolts 31 radially inwardly and unlocking the mold. The cupped or dished portions 41 are provided adjacent the forward edge of dovetail member 38 in order to allow for longitudinal adjustment of push rods 19 relative to member 18 by means of locking nuts 20. If these flared portions 41 were not provided and push rods 19 were adjusted forwardly of the position in Figure 3, as for example, to take up wear in the locking faces, when push rods 19 were retracted, the pins 42 would strike the flat forward face of dovetail 38 and damage would result. Consequently, inclined edges 40 are flared sufficiently at 41 to allow for the maximum longitudinal adjustment of push rods 19.

In order to retain locking bolts 31 after the mold halves have been separated to the position of Figure 2, there is provided for each of the bolts 31 a detent 43 which is yieldingly urged rearwardly by a spring 44 and which is adapted to be received within a recess 45 provided on the forward face of locking bolt 31. Instead of this means, any other means of suitable type may be provided to hold the locking bolt in the retracted position.

From the foregoing, it will be seen that the construction of Figures 1 to 6 gives rise to an unusually compact mechanism which is simple and efficient. The mechanism is advantageous because the cam rods 19 have a bearing surface continuing up to the locking bolts 31, the bores 21 acting in conjunction with the bores in the mold half 14 to present this continued bearing surface. After the cam rods traverse the bores 32, their forward end is likewise supported by the forwardly extending portion of the bores 21 beyond the locking bolts, as indicated in Figure 3. If desired, the pressure behind mold closing piston 16 may be maintained after locking has been effected. However, since the locking is irreversible, this will not be necessary and moreover since hydraulic motor 15 may be of such small power this would not aid materially in maintaining the mold locked, although it might simplify the controls to maintain pressure behind piston 16 during the molding operation.

Referring now to the modification shown in Figures 7 to 10, the construction is in general similar to that already described, except that a different locking means is self locked and unlocked by the closing and opening of the mold. This locking mechanism is the same as that described in my copending application, above identified. The mold half 14a is yieldingly carried as before in a longitudinal movable member 18a. Movable mold half 14a has a plurality of angularly spaced outwardly extending locking teeth or lugs 46 having inclined locking faces 47. Rotatably mounted upon stationary mold half 4 is a locking sleeve 48 which has a flange 49 extending inwardly behind a broken shoulder 50 extending integrally outward from fixed mold half 4a, this shoulder 50 being broken solely to permit assembly. Sleeve 48 has a plurality of angularly spaced, inwardly extending teeth or lugs 51 which have forward angularly inclined locking faces 52, and which are adapted to cooperate in wedging engagement with locking lugs 46 of the movable mold half 14a.

Forwardly extending from and fixedly attached to member 18a are two or more members 53 which carry on their forward ends inwardly extending, fixedly attached cylindrical locking members 54. For each of the locking members 54 there is formed integrally on the exterior of locking sleeve 48 a pair of upward projections 55 and 56, these projections being curved on their adjacent faces to cooperate with member 54 to lock and unlock the mold. Projection 55 has the curved surface 57 for locking sleeve 48 while projection 56 has the curved surface 58 for unlocking sleeve 48. It is desirable to have sleeve 48 so mounted that it will stay in any position of rotation so that after member 18a is retracted, it will stay in such alignment therewith that member 18a can be pushed forwardly and mold half 14a received into engagement with mold half 4a and member 54 received between projections 55 and 56. This temporary fixation of sleeve 48 may be accomplished by providing sufficient frictional engagement between sleeve 48 and any stationary member such as support 2, as at 59.

From the foregoing, it will be seen that as member 18a moves forwardly from the position in Figure 7, the lugs 46 will be received behind lugs 51 and mold member 14a will be received into engagement with mold member 4a within the locking sleeve, whereupon the forward movement of mold member 14a will cease, spring 25 being compressed, and member 18 will continue forwardly, causing locking members 54 to be received within the locking groove formed by projections 55 and 56, causing sleeve 48 to be rotated in a direction counterclockwise of Figures 9 and 10 and causing irreversible wedging engagement between the teeth 46 and the teeth 51. When it is desired to unlock the mold, piston 16 will be retracted, whereupon member 18a will first move rearwardly, causing sleeve 48 to be rotated in a direction clockwise of Figures 9 and 10, after which piston 23 will be engaged by the forward portion 60 of member 18a whereupon the mold half 14a will be withdrawn rearwardly into the position shown in Figure 7.

From the foregoing detailed description of two embodiments of the present invention, it will be seen that the present invention provides means associated with the mold halves themselves and operated solely by the step of engaging or disengaging the mold halves to effect locking or unlocking of the mold halves. This locking is irreversible and is of an order many times greater than that which could be obtained from the direct action of hydraulic motor 15. At the same time, unlocking is relatively easily accomplished. In addition, the present invention provides for elimination of many parts and requires merely the usual mold moving hydraulic motor 15 which, however, need not be nearly as powerful as the usual mold clamping hydraulic motor which in the usual installation serves both to move the mold halves together and to hold them in locked relationship against the pressure of the injection.

It will be seen that the present invention eliminates the control and synchronizing means for effecting operation of the mold locking and unlocking mechanism after mold engagement or prior to mold disengagement. Numerous other advantages of the present construction will be apparent to those skilled in the art.

The principles of the present invention, may, if desired, be applied in locking and unlocking the injection cylinder to and from the mold half with which it cooperates. The invention is applicable to the die-casting of either plastic or metal. The invention may be practiced by holding member 18 or 18a stationary and moving mold half 4 or 4a towards it or by moving both 18 or 18a and 4 or 4a towards one another.

I wish it to be understood that I intend to include as within the invention such modifications as may be necessary to adapt the same to varying conditions and uses and which fall within the terms or spirit of the appended claims.

Having thus fully described my invention, what I claim as new and desire to secure by Letters Patent is:

1. In combination, a pair of mold halves, one of which is movable, means for moving said movable mold half into engagement with the other, said means supporting said movable mold half, said movable mold half being supported upon said moving means so that there is relative longitudinal movement provided for between said mold half and said supporting means, spring means interposed between said supporting means and said movable mold half and tending normally to separate said mold half and said supporting means, locking means movable during locking action carried upon one of said mold halves, and means carried upon the other of said mold halves for directly actuating said locking means by the relative movement between said moving means and said movable mold half after engagement of said mold halves for locking said mold halves together.

2. In combination, a pair of mold halves, one of which is movable, a support member upon which one of said mold halves is so mounted that there may be relative longitudinal movement between said last-named mold half and said member, means for moving said movable mold into engagement with the stationary mold and for moving said support member with respect to the mold member carried thereby, cam lugs on said mold half carried by said support member, a locking sleeve rotatable upon the other mold half and having cooperating cam lugs adapted to cooperate lockingly with said first-named lugs upon relative rotational movement between said sleeve and said mold half on said support member, and means actuated by said relative longitudinal movement between said mold half on said support member and said member after engagement of said mold halves for effecting said relative rotational movement of said sleeve for lockingly engaging said lugs.

3. In combination, a pair of mold halves, one of which is movable, a support member upon which one of said mold halves is so mounted that there may be relative longitudinal movement between said last-named mold half and said member, means for moving said movable mold into engagement with the stationary mold and for moving said support member with respect to the mold member carried thereby, cam lugs on said mold half carried by said support member, a locking sleeve rotatable upon the other mold half and having cooperating cam lugs adapted to cooperate lockingly with said first-named lugs upon relative rotational movement between said sleeve and said mold half on said support member, and means actuated by said relative longitudinal movement between said mold half on said support member and said member after engagement of said mold halves for effecting said relative rotational movement of said sleeve for lockingly engaging said lugs, and means for causing opposite relative longitudinal movement between said mold half on said support member and said member before disengagement of said mold halves for effecting opposite relative rotational movement of said sleeve to unlock said lugs.

4. In combination, a pair of mold elements one of which is movable relative to the other and in axial alignment therewith, movable means supporting said movable mold element, cam lugs on one of said mold elements, a locking sleeve on the other of said mold elements having cam lugs for cooperating with the first mentioned lugs for locking by engaging the same, means for rotationally actuating said sleeve carried upon said movable supporting means, and means for moving said supporting means and mold supported thereby to cause engagement of said mold elements and actuation of said sleeve to lock said mold elements together.

CHARLES D. RYDER.